A. BINDER.
Corn-Plows.

No. 166,333. Patented Aug. 3, 1875.

Witnesses:
Chas. Nida
H. L. Wattenberg

Inventor:
Anton Binder
per G. W. Hyper
Atty.

UNITED STATES PATENT OFFICE.

ANTON BINDER, OF LEHIGH TANNERY, PENNSYLVANIA.

IMPROVEMENT IN CORN-PLOWS.

Specification forming part of Letters Patent No. 166,333, dated August 3, 1875; application filed May 17, 1875.

*To all whom it may concern:*

Be it known that I, ANTON BINDER, of Lehigh Tannery, in the county of Carbon and State of Pennsylvania, have invented a new and useful Improvement in Corn-Plows; and that the following is a full, clear, and exact description of the same, reference being had to the accompanying drawings, and to the letters of reference marked thereon, making a part of this specification.

This invention is in the nature of an improvement in corn-plows; and the invention consists in a plow with adjustable mold-boards, in combination with a screw and links, guide-braces, and wheel, all arranged, constructed, and operated in the manner hereinafter more particularly described.

Figure 1:
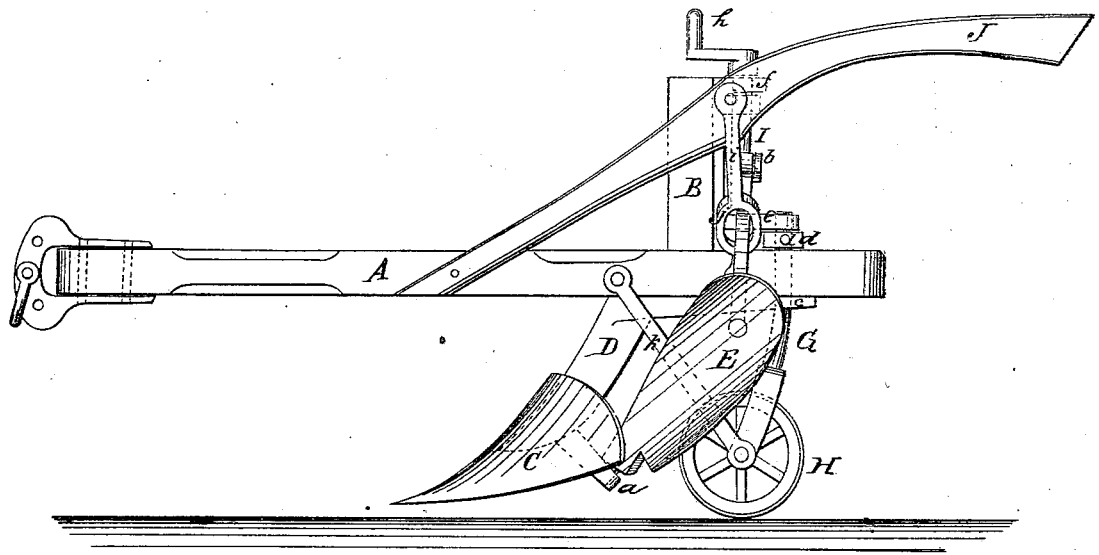
Figure 2:
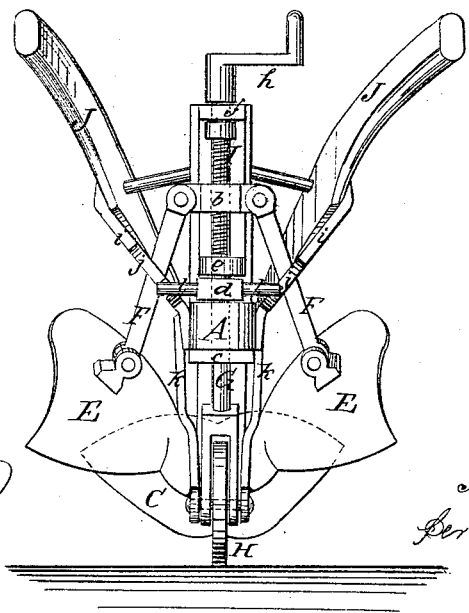

In the accompanying sheet of drawings, Figure 1 represents a side elevation of my improved plow; Fig. 2, a rear end view of same.

Similar letters of reference indicate like parts in both figures.

A represents the beam of my plow. On the top of this beam, and near its rear end, is firmly secured an upright, B, and to the under side of the beam, and near its rear end, is attached a plowshare, C. This share is spear-shaped, as shown in Fig. 2. To the standard D, to which the share C is secured, are affixed two mold-boards E E. These mold-boards are secured to the standard by being pivoted at their lower ends into suitable bearings $a$. To the inner side of each of the mold-boards E E, and near their upper ends, are secured, by hinge-joints, links, or braces F. The upper ends of these braces are secured, by hinge-joints, to a nut or traveler, $b$. Between the mold-boards E E projects a shaft, G, terminating in a suitable bearing, $c$, within which is placed a wheel, H. The upper end of this shaft, where it projects above the beam, has formed upon it screw-threads, onto which is fitted a nut, $d$. The upper end of this shaft works into a bearing, $e$, which, as well as a bearing, $f$, is secured to the upright B. Passing through the bearing $f$ and the nut $b$ is a screw, I. This screw has fitted to its upper end a crank, $h$. Secured to the beam A are the handles J. These handles are braced to the upright B, and they have also small braces $i\ i$, which extend from the handles to the sides of the beam. The links or braces F pass through suitable openings $j\ j$ made through these braces $i\ i$, which act as guides to the links F.

From the lower end of the shaft G extend forward two brace-rods, $k\ k$, which strengthen the bearing $c$ of the wheel H.

My plow being constructed substantially as above described, its operation is as follows: The plow being particularly adapted for cultivating corn, potatoes, and such like things, it is placed between the plants with, say, one horse attached to the front end of the beam, and a furrow formed between the growing plants by the share C and mold-boards E E. If the space between the plants is narrow, the mold-boards E E are drawn in as closely as may be desired by simply turning the crank $h$, which operates upon the links F, drawing them upward, and they, in turn, drawing in the mold-boards. If the space between the growing plants is wide the mold-boards are thrown out by a reverse action of the crank, screw, and links, and the earth is spread or thrown around the plants.

The depth which it is desired to form the furrow is regulated by the wheel H, which may be raised or lowered by the action of the nut $d$, to which are fixed handles $l$ for that purpose—the lower the wheel the less depth to the furrow, and the higher the wheel the deeper the furrow.

In connection with the raising and lowering of the wheel H, the ordinary clevis at the end of the plow should be adjusted accordingly, as the wheel is raised or lowered.

Having thus described my invention, what I claim as new, and desire to secure by Letters Patent, is—

1. In a plow, the combination of the pivoted mold-boards E, their adjusting links F, screw I, traveler $b$, guide-braces $i\ j$, and depth-regulating wheel H, constructed and arranged as shown and described.

2. The combination of the guide-braces $i\ j$ with the adjusting links and mold-boards, substantially as shown and described.

ANTON BINDER.

Witnesses:
D. K. SHOEMAKER,
F. BERTOLETTE.